United States Patent
Biselx

(10) Patent No.: US 9,207,056 B2
(45) Date of Patent: Dec. 8, 2015

(54) PORTABLE INSTRUMENT FOR MEASURING DIMENSIONS

(71) Applicant: TESA SA, Renens (CH)

(72) Inventor: Frédéric Biselx, Yens (CH)

(73) Assignee: TESA SA, Renens (CH)

( * ) Notice: Subject to any disclaimer, the term of this patent is extended or adjusted under 35 U.S.C. 154(b) by 229 days.

(21) Appl. No.: 13/748,438

(22) Filed: Jan. 23, 2013

(65) Prior Publication Data

US 2013/0269199 A1 Oct. 17, 2013

(30) Foreign Application Priority Data

Apr. 12, 2012 (EP) .................................. 12164005

(51) Int. Cl.
  *G01B 3/00* (2006.01)
  *G01B 3/20* (2006.01)
(52) U.S. Cl.
  CPC ................ *G01B 3/002* (2013.01); *G01B 3/205* (2013.01)
(58) Field of Classification Search
  CPC .......... G01B 3/18; G01B 3/002; F16H 25/00; F16H 57/08
  USPC ............................................ 33/813, 820, 832
  See application file for complete search history.

(56) References Cited

U.S. PATENT DOCUMENTS

| | | | | |
|---|---|---|---|---|
| 5,383,280 A * | 1/1995 | McDermott | ............ | 33/361 |
| 5,433,016 A * | 7/1995 | Tachikake et al. | ........ | 33/820 |
| 5,574,381 A * | 11/1996 | Andermo et al. | ......... | 33/705 |
| 6,260,286 B1 * | 7/2001 | Suzuki et al. | ............. | 33/813 |
| 6,513,262 B1 | 2/2003 | Borgognon et al. | | |
| 6,748,665 B1 * | 6/2004 | Samp | ........................ | 33/348.2 |
| 6,807,741 B1 * | 10/2004 | Lin | ......................... | 33/286 |
| 7,173,197 B1 * | 2/2007 | Kasperek | .................. | 33/772 |
| 7,231,726 B2 * | 6/2007 | Matsumiya et al. | ....... | 33/755 |
| 8,310,227 B2 * | 11/2012 | Lai | ............................ | 33/780 |
| 8,402,671 B1 * | 3/2013 | Marhold | ................... | 33/758 |
| 2003/0047009 A1 | 3/2003 | Webb | | |
| 2007/0056183 A1 * | 3/2007 | Suzuki et al. | ............. | 33/832 |
| 2008/0110037 A1 * | 5/2008 | Hayase et al. | ............ | 33/290 |
| 2008/0236442 A1 * | 10/2008 | Spaulding et al. | ........ | 33/414 |
| 2012/0203504 A1 | 8/2012 | Jordil et al. | | |
| 2013/0269199 A1 * | 10/2013 | Biselx | ....................... | 33/810 |

FOREIGN PATENT DOCUMENTS

| | | |
|---|---|---|
| EP | 1 094 294 A1 | 4/2001 |
| EP | 1 559 988 A1 | 8/2005 |
| EP | 2 487 452 A1 | 8/2012 |
| JP | 07-27501 A | 1/1995 |
| JP | 2902271 B2 | 6/1999 |

OTHER PUBLICATIONS

European Search Report dated Sep. 25, 2012 as received in application No. 12164005.6.

* cited by examiner

*Primary Examiner* — Yaritza Guadalupe-McCall
(74) *Attorney, Agent, or Firm* — Maschoff Brennan

(57) ABSTRACT

Portable instrument for measuring dimensions, comprising a scale, a position sensor capable of being displaced relative to the scale and a watertight housing defining an internal volume comprising the display, the electronic reading circuit and a power source. Additional functional layers, for example an over-molded elastomer thermoplastic layer and a metallic plate, protect the instrument and add to it specific tactile and visual qualities.

14 Claims, 2 Drawing Sheets

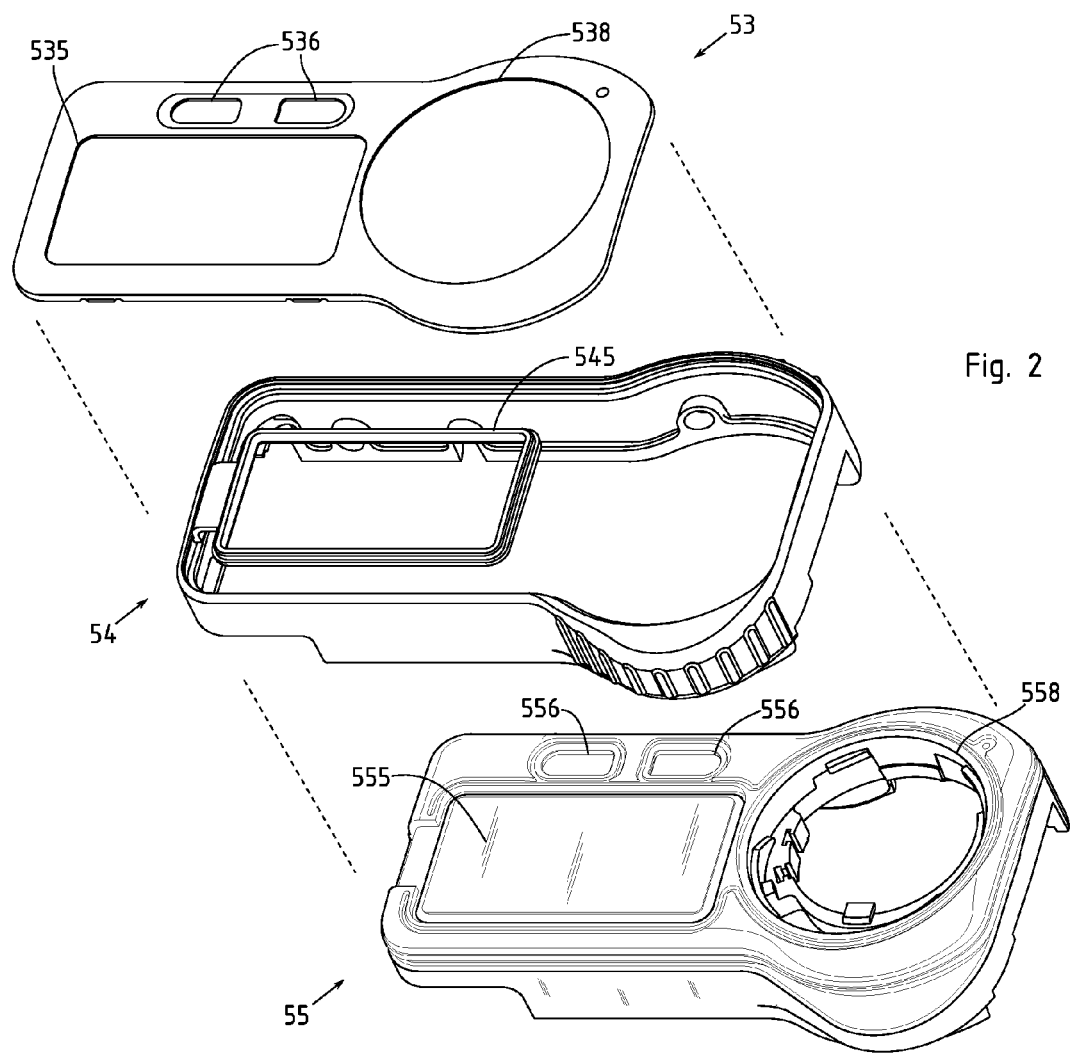
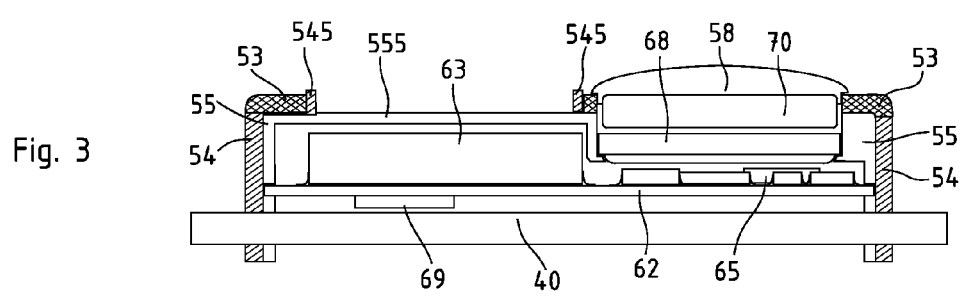
Fig. 2
Fig. 3

PORTABLE INSTRUMENT FOR MEASURING DIMENSIONS

REFERENCE DATA

The present application claims priority from European Patent Application EP12164005.6 of Apr. 12, 2012, the contents whereof are hereby incorporated in their entirety.

TECHNICAL FIELD

The present invention concerns a portable instrument for measuring dimensions, notably an electronic instrument such as a sliding caliper, a micrometer, a comparator, a plug gauge, or any measuring instrument equipped with an electronic circuit for measuring and displaying a dimension and capable of operating in an industrial environment subject to projections of liquids or dust.

STATE OF THE ART

Sliding calipers and the other portable instruments for measuring dimensions are commonly used in mechanical workshops for measuring, comparing and checking the dimensions of the machined parts. These instruments must supply precise measurements in often-difficult environments, prone to projections of cutting fluids and to a considerable level of dust.

Specific standards are used for quantifying the tolerance of these instruments to environmental conditions, such as for example norm CEI60529, which regroups electric and electronic devices according to protection classes relatively to their immunity against foreign objects and against liquids. The protection index IP67 characterizes for example devices that are totally protected against dust and against the effects of immersion up to a depth of one meter.

These levels of protection are achieved, in the known art, by watertight resp. airtight housings that surround the elements sensitive to liquids and foreign objects. This is achieved for example by rubber joints, O-rings, glued connections and so on. The housings furthermore normally comprise several openings for buttons, the display, access to the batteries etc. that provide potential access points for liquids and foreign particles. All these openings must be made waterproof resp. airtight by joints or glued connections.

Making transparent windows for reading the display notably causes difficulties when watertight resp. airtight instruments are to be made. These windows are normally made by thin transparent resin plates that are glued or welded onto the housing. The window-housing connection can however yield due to shocks, deformations or repeated aggression by solvents, resulting in a loss of tightness.

More and more, people in mechanical workshops use measuring instruments with a data interface, capable of transmitting the measured dimensions to a computer, a printer or another device for further processing or for storing. In this field, use is made of transmission interfaces of the wired type, for example according to the standards RS232, RS422 or USB, which are accepted by nearly all equipment and computers but which comprise a connector on the housing that also needs to be protected against liquids and dust.

Portable measuring instruments are also known that have wireless communication interfaces. This solution enables the data connector to be omitted but enables communication only with devices compatible with the protocol used and increases battery consumption.

These known construction practices result in a multiplication of parts and of assembly steps for an instrument. There is thus a need for watertight resp. airtight measuring instruments that have a simpler and more economical construction.

Sliding calipers and the other similar measuring instruments are subjected, when used in a workshop, to projections of various liquids, including lubricants and solvents. It is thus necessary to have instruments capable of tolerating these aggressive substances and that can be grasped in a secure manner, even when they are covered by a lubricating film. There is also a necessity for instruments exhibiting resistance to shocks, which are inevitable when used in an industrial environment.

BRIEF SUMMARY OF THE INVENTION

One aim of the present invention is to propose a portable instrument for measuring dimensions that is free from the limitations of the known instruments.

According to the invention, these aims are achieved notably by means of the object of the independent claim.

In the remainder of the present description and claims, reference is made to a precision slide caliper. It must however be understood that this is not an essential limitation of the invention to this type of instrument, the invention comprising any portable electronic measuring instrument capable of being equipped with the elements mentioned in the characterizing part of claim 1, such as for example micrometers, comparators, measuring handles, probes and more generally portable electronic measuring apparatus.

When the present specification and claims mention electric batteries, it must also be understood that this does not represent a limiting characteristic of the invention, the batteries being able to be replaced by any kind of autonomous electric power source without falling outside the scope of the invention. One can mention, by way of non-exhaustive examples of autonomous power sources, rechargeable accumulators, for example LiPO (Lithium Polymer) batteries, Li-ion, Ni-MH, generators transforming mechanical into electrical energy or photovoltaic modules.

When in the description and in the claims the terms 'up', 'down', 'lower', 'upper', 'lateral' etc. are used, it must be understood that these designations indicate directions relative to the usual and conventional orientation of the measuring instrument, placed on a horizontal plane with the display screen upwards.

BRIEF DESCRIPTION OF THE FIGURES

Examples of embodiments of the invention are given in the description illustrated by the attached figures, in which:

FIG. 2 shows the housing of a slide caliper according to the invention separated into three elements;

FIG. 3 shows, diagrammatically, a cross-section of the housing of the inventive slide caliper.

EXAMPLE(S) OF EMBODIMENTS OF THE INVENTION

Figure 1:
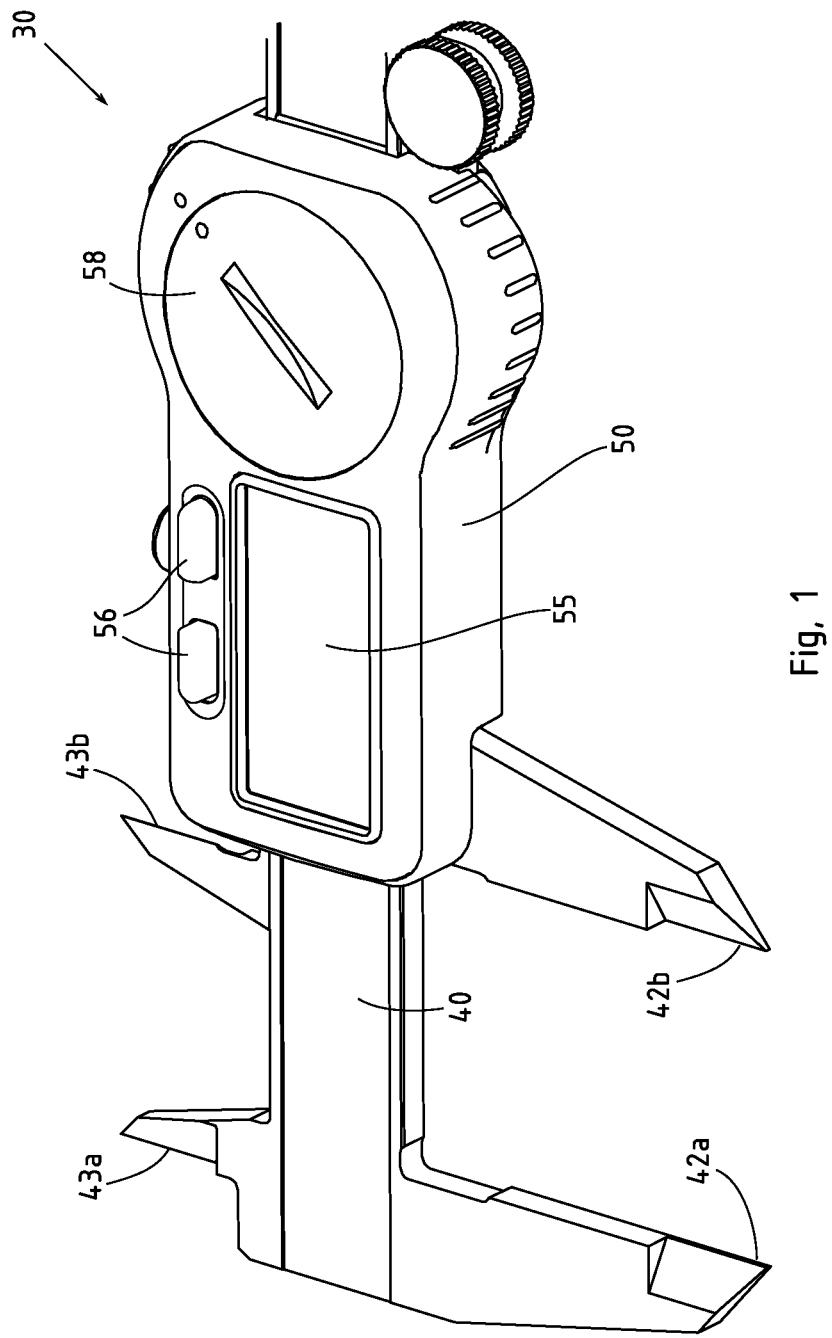
FIG. 1 illustrates an assembled slide caliper according to one aspect of the invention.

According to the embodiment of the invention illustrated in FIG. 1, the caliper 30 comprises a longitudinal shaft onto which a slide can move longitudinally. The shaft can have different lengths depending on the instrument's intended use, for example 20 cm, and is provided with one or more stationary jaws 42*a*, 43*a* whilst the slide bears a same number of mobile jaws 42b, 43b that move along the shaft whilst remaining parallel to the stationary jaws.

The shaft of the sliding caliper 30 carries a scale that can be read by a sensor moving with the slide in order to determine the latter's relative position. A sensor without contact with the scale 40 is preferably used, for example a magnetic sensor, whilst the scale 40 has a periodic grid of magnetized regions with alternating polarities or another arrangement of appropriate magnetic regions. In one embodiment, an inductive, optical or capacitive type sensor can be used with an appropriate scale.

The watertight housing 55 is fastened to the slide and comprises, in its internal volume, an electronic processing circuit 65 (visible in FIG. 3) arranged so as to read the signals coming from the sensor 69 and to display an indication depending on the position of the sensor 69 relative to the scale on the display device 63, also comprised within the internal volume of the waterproof housing 55. According to an important aspect of the invention, the housing 55 is constituted of a single element molded out of a transparent material enabling the display means 63 inside it to be read.

The housing 55 preferably covers the display 63 and the electronic circuit 65 from above, i.e. in the direction perpendicular to the display screen 63, and laterally. The internal volume is made tight from below by the printed circuit board 62 onto which the display 63 and the components of the electronic circuit 65 are mounted. The board 62 is screwed and compresses a flat gasket. It can also be glued or welded to the housing 55.

The position sensor 69 is represented in the illustrated example on the lower side of the printed circuit, thus outside the tight volume defined by the housing 55. This arrangement enables a close proximity between the sensor 69 and the scale 40, which is beneficial for the reading accuracy. The sensor 69 can be embedded in resin or protected from water by any appropriate method. Furthermore, the fact that the sensor 69 is mounted onto the same printed circuit 62 as the processing circuit 65 avoids using a connector that could constitute an access point for liquids and foreign objects into the tight housing 55. It would however be also conceivable to integrate the sensor 69 inside the tight volume by connecting it onto the other side of the printed circuit 62.

The housing 55 can be made from any injectable transparent substance. Good mechanical characteristics and a good resistance to water and solvents are however desirable. Certain polyamide resins have a high level of transparency and hardness allied to good resilience properties and resistance to flexion and fatigue, and can advantageously be used in this aspect of the invention.

The housing 55 optionally comprises openings 556 for allowing buttons 56, visible in FIG. 1, to pass through and used for controlling the functions of the measuring instrument, for example the start/stop, resetting or any other necessary function. The buttons 55 can be made watertight by flexible membranes or any other appropriate method. According to an embodiment, not illustrated, the buttons 56 could be made integrally with the housing 55 if the material used exhibits sufficient flexibility, thus completely avoiding the openings 556.

The housing 55 preferably also comprises a plane surface 555 placed opposite the display device 63 enabling the latter to be read without image distortions or alterations. This plane surface serves as a reading window and, being made integrally with the watertight housing, does not have the disadvantages of the glued transparent windows used in the known art.

The housing 55 preferably comprises a compartment 558 (visible in FIG. 2) for an autonomous electric power source 68, for example a button-type Lithium battery providing electric power to the circuit 65. When the power is provided by batteries, their replacement is possible through the cover 58, visible in FIGS. 1 and 3, which can be engaged in watertight fashion into the housing 55. Preferably, the watertight engagement of the cover 58 is achieved by a bayonet or screw coupling provided with a joint, since this system affords excellent protection whilst remaining detachable with common tools. In a variant embodiment, not illustrated, the joint can be integrated into the over-molded layer 54. Other arrangements are however possible and included in the frame of the present invention.

According to one advantageous aspect of the invention, the battery cover 58 can include an auxiliary electronic circuit 70 communicating with the processing circuit 65 by means of electrical connections, not represented, and enabling the functions of the instrument to be expanded. This characteristic makes it possible to add further electronic modules inside the internal volume of the instrument's housing without adding openings and connectors to the watertight housing 55.

The auxiliary electronic circuit 70 can be realized by a radio interface circuit according to the Bluetooth®, HomeRF®, WiFi®, ZigBee® or any other communication standard, enabling data to be exchanged between the instrument 30 and a printer, a computer, a portable telephone or any other device. The auxiliary circuit 70 could also include a non-volatile memory unit, for example an E2PROM or flash type memory for storing the measurements performed and their subsequent analysis, or a memory comprising measurement parameters. Variants and further details regarding the auxiliary circuit 70 are included in European patent application EP2487452 in the applicant's name.

According to one aspect of the invention, the housing 55 is at least partly covered by functional layers that provide it with desirable properties.

A non-transparent layer 54 can be used for hiding from sight the housing's internal components that one does not wish to show and for improving the tactile and visual qualities of the instrument. The represented embodiment comprises an elastomer thermoplastic layer 54 over-molded onto the transparent housing and covering its sides. This layer can be made of several materials, depending on the nature of the housing 55 and the required degree of resistance. In one variant, not illustrated, the buttons 56 can be injected at the same time as the over-molded layer 54 and integrated with it, thus making the openings 556 perfectly watertight. The profile 545 serves to protect the plane surface 555.

A metallic layer or plate 54 can be used for protecting at least part of the transparent housing 55 from shocks and give it an aesthetic aspect. This plate comprises, in the illustrated example, openings 535 for the reading window 555, 536, for the buttons 56 and 538 for the battery compartment. It can be, for example, drawn and cut from sheet material of the appropriate thickness in a suitable die, and press-fit or glued onto the housing 55.

REFERENCE NUMBERS USED IN THE FIGURES

30 measuring instrument
40 scale
42a stationary jaw
42b sliding jaw
43a stationary jaw
43b sliding jaw 50 assembled housing
53 metallic plate
54 over-molding
55 transparent watertight resp. airtight housing
56 button
58 cover for the battery compartment
62 printed circuit
63 display device
65 processing circuit
68 battery
69 contactless position sensor
70 complementary circuit
535 opening for the screen
536 openings for the buttons
538 opening for the batteries
545 protection profile
555 display window
556 openings for the buttons
558 battery compartment

The invention claimed is:

1. Portable instrument for measuring dimensions, comprising a position sensor, a scale, and a watertight housing defining an internal volume in which are placed:
   electronic display means;
   a processing circuit enabling an indication depending on the position of the position sensor to be displayed on the display means;
   wherein said housing comprises a molded part of transparent material enabling the display means to be read and surrounding the processing circuit and the display means, the housing is at least partly covered by an over-molded non-transparent layer,
   wherein the position sensor is capable of being displaced relative to the scale and providing an indication of its position relative to the scale.

2. The portable instrument of claim 1, wherein the position sensor is inside the internal volume of the watertight housing.

3. The portable instrument of claim 1, wherein the housing is at least partly protected by a metallic plate.

4. The portable instrument of claim 1, wherein said processing circuit and/or said display means and/or said position sensor are mounted onto a printed circuit board fastened to the housing so as to make said internal volume watertight.

5. The portable instrument of claim 1, comprising a compartment for a replaceable electric power source closed in watertight manner by a detachable cover comprising an electronic circuit.

6. The portable instrument of claim 5, wherein the housing is at least partly covered by an over-molded layer integrating a joint making said detachable cover watertight.

7. The portable instrument of claim 1, wherein the position sensor is a contactless sensor.

8. The portable instrument of claim 1 wherein said scale has a grid of regions with determined magnetic characteristics and said sensor is a sensor sensitive to the magnetic field.

9. The portable instrument of claim 1, wherein said scale has a grid of regions with determined optical characteristics and said sensor is an optical sensor.

10. The portable instrument of claim 1, wherein said scale has a grid of regions with determined inductive or capacitive characteristics and said sensor is an inductive or capacitive sensor.

11. The portable instrument of claim 1, wherein said sensor is sensitive to the linear or angular position of said scale.

12. The portable instrument of claim 1, wherein the housing comprises openings for allowing control buttons to pass and is at least partly covered by an over-molded non-transparent layer integrating said buttons and making said openings watertight.

13. The portable instrument of claim 1, further comprising a slide caliper wherein said scale is fixedly united with a longitudinal shaft of said slide caliper and said housing is fastened on a slide arranged so as to slide longitudinally along the shaft.

14. The portable instrument of claim 1, further comprising a micrometer, wherein said scale is fixedly united with a feeler mobile relative to said housing.

* * * * *